(12) United States Patent
Wang et al.

(10) Patent No.: US 10,516,457 B2
(45) Date of Patent: Dec. 24, 2019

(54) BEAMFORMING ENHANCEMENTS FOR SPATIAL REUSE IN WIRELESS NETWORKS

(71) Applicant: MEDIATEK Singapore Pte. Ltd., Singapore (SG)

(72) Inventors: James June-Ming Wang, San Marino, CA (US); Jianhan Liu, San Jose, CA (US); Thomas Edward Pare, Jr., Mountain View, CA (US); Chao-Chun Wang, Taipei (TW); Chih-Shi Yee, Hsinchu (TW); YungPing Hsu, Taipei (TW)

(73) Assignee: MEDIATEK Singapore Pte. Ltd., Singapore (SG)

( * ) Notice: Subject to any disclaimer, the term of this patent is extended or adjusted under 35 U.S.C. 154(b) by 358 days.

(21) Appl. No.: 14/979,429

(22) Filed: Dec. 27, 2015

(65) Prior Publication Data

US 2016/0112107 A1 Apr. 21, 2016

Related U.S. Application Data

(63) Continuation of application No. PCT/US2014/044471, filed on Jun. 27, 2014.

(60) Provisional application No. 61/840,671, filed on Jun. 28, 2013, provisional application No. 61/845,703, filed on Jul. 12, 2013, provisional application No. 61/861,561, filed on Aug. 2, 2013.

(51) Int. Cl.
*H04B 7/06* (2006.01)
*H04W 74/08* (2009.01)
*H04L 1/00* (2006.01)

(52) U.S. Cl.
CPC .............. *H04B 7/0617* (2013.01); *H04L 1/00* (2013.01); *H04W 74/0816* (2013.01)

(58) Field of Classification Search
None
See application file for complete search history.

(56) References Cited

U.S. PATENT DOCUMENTS

| 5,592,490 A | 1/1997 | Barratt et al. ................. 370/310 |
| 2005/0176385 A1 | 8/2005 | Stern-Berkowitz et al. ................ 455/101 |
| 2006/0067269 A1* | 3/2006 | Jugl ..................... H04W 72/121 370/329 |

(Continued)

FOREIGN PATENT DOCUMENTS

WO WO2014011117 A1 7/2012

OTHER PUBLICATIONS

EPO, Search Report for the EP patent application 14817147.3 dated Jan. 16, 2017 (9 pages).

(Continued)

*Primary Examiner* — Jason E Mattis
*Assistant Examiner* — Bao G Nguyen
(74) *Attorney, Agent, or Firm* — Imperium Patent Works; Zheng Jin

(57) ABSTRACT

A method of enhanced beamforming procedure to achieve spatial reuse and thereby improving cell edge performance and area throughput is proposed. The enhanced beamforming method increases the likelihood of channel access under dense deployment condition, reduces interference to OBSS, reduces collision during reception, and increases the likelihood of spatial reuse in dense deployment scenario thus leading to higher network throughput.

23 Claims, 6 Drawing Sheets

(56) References Cited

U.S. PATENT DOCUMENTS

| | | | |
|---|---|---|---|
| 2006/0221920 A1* | 10/2006 | Gopalakrishnan | H04B 7/0617 370/338 |
| 2008/0175198 A1* | 7/2008 | Singh | H04W 28/18 370/329 |
| 2009/0059890 A1 | 3/2009 | Cordeiro et al. | 370/348 |
| 2010/0177719 A1 | 7/2010 | Shao et al. | 370/329 |
| 2011/0103352 A1* | 5/2011 | Wentink | H04W 74/008 370/336 |
| 2013/0012134 A1 | 1/2013 | Jin et al. | 455/62 |
| 2014/0098681 A1 | 4/2014 | Stager et al. | 370/252 |
| 2014/0177607 A1* | 6/2014 | Li | H04B 7/0617 370/336 |
| 2016/0066198 A1* | 3/2016 | Wang | H04W 16/28 370/338 |
| 2016/0165630 A1* | 6/2016 | Oteri | H04W 74/04 370/336 |
| 2017/0041952 A1* | 2/2017 | Kim | H04W 74/08 |

OTHER PUBLICATIONS

XiaoFeng Lu et al., An adaptive directional MAC protocol for ad hoc networks using directional antennas, Science China Information Sciences, published online Mar. 12, 2012 *p. 1364-1365; figures 2,3*.

International Search Report and Written Opinion of International Search Authority for PCT/US14/44471 dated Nov. 14, 2014(8 pages).

EPO, Search Report for the EP patent application 14817147.3 dated Mar. 13, 2018 (6 pages).

Romit Roy Choudhury et al.: "Using directional antennas for medium access control in ad hoc networks", Proceedings of the 8th annual international conference on mobile computing and networking, Sep. 23, 2002, pp. 59-70.

\* cited by examiner

TXOP-BASED BEAMFORMED FRAME EXCHANGE

TXOP-BASED BEAMFORMED AND SO FRAME EXCHANGE

BEAMFORMING ENHANCEMENTS FOR SPATIAL REUSE IN WIRELESS NETWORKS

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/US14/44471, with an international filing date of Jun. 27, 2014, which in turn claims priority from U.S. Provisional Application No. 61/840,671 filed on Jun. 28, 2013, U.S. Provisional Application No. 61/845,703 filed on Jul. 12, 2013, and U.S. Provisional Application No. 61/861,561 filed on Aug. 2, 2013. This application is a continuation of International Application No. PCT/US14/44471, which claims priority from U.S. Provisional Application Nos. 61/840,671, 61/845,703, and 61/861,561. International Application No. PCT/US14/44471 is pending as of the filing date of this application, and the United States is a designated state in International Application No. PCT/US14/44471. This application claims the benefit under 35 U.S.C. § 119 from U.S. Provisional Application Nos. 61/840,671, 61/845,703, and 61/861,561. The disclosure of each of the foregoing documents is incorporated herein by reference.

TECHNICAL FIELD

The disclosed embodiments relate generally to wireless network communications, and, more particularly, to beamforming enhancements in wireless communications systems.

BACKGROUND

IEEE 802.11 is a set of media access control (MAC) and physical layer (PHY) specification for implementing wireless local area network (WLAN) communication, called WiFi, in the unlicensed (2.4, 3.6, 5, and 60 GHz) frequency bands. The standards and amendments provide the basis for wireless network products using the WiFi frequency bands. An enhanced distributed channel access (EDCA) protocol is used in WiFi networks as a channel contention procedure for wireless devices to gain access to the shared wireless medium, e.g., to obtain a transmitting opportunity (TXOP) for transmitting radio signals onto the shared wireless medium. When one device wins the medium contention (i.e., gains the TXOP), all other devices back off from using the medium to allow frame exchange between a pair of devices during the TXOP. This simple CSMA/CA with random back-off contention scheme and low cost ad hoc deployment in unlicensed spectrum have contributed rapid adoption of WiFi systems in the past 30 years.

Today, WiFi devices are over-populated. Dense deployment has led to significant issues such as interference, congestion, and low throughput. High bandwidth applications (e.g., video streaming) also demand better performance from WiFi systems. Limited new spectrum are unable to meet the demand. However, the development of WiFi so far focus on increasing physical rate to achieve higher spectral efficiency, but not higher area throughput to achieve spatial efficiency. Area throughput/average throughput per STA is a key metric in TGax (Hew) in dense deployment scenarios. Therefore, WiFi must evolve in increasing the spatial efficiency to meet the new usage requirements.

Beamforming is an effective way to enhance cell edge performance. In general, beamforming can achieve higher physical rate, reduced interference to OBSS via beamformed transmission, reduced interference from OBSS via beamformed reception, and reduced delay spread. When more energy is delivered to the targeted receiver through TX beamforming, the less interference toward others. RX beamforming also mitigates the interference level. Results shown improved cell edge performance with TX or RX beamforming and less degradation in dense deployment.

A solution is sought to utilize beamforming as a way for exploring the possibility of spatial reuse to improve network capacity.

SUMMARY

A method of enhanced beamforming procedure to achieve spatial reuse and thereby improving cell edge performance and area throughput is proposed. The enhanced beamforming method increases the likelihood of channel access under dense deployment condition, reduces interference to OBSS, reduces collision during reception, and increases the likelihood of spatial reuse in dense deployment scenario thus leading to higher network throughput.

In one embodiment, an initiating wireless device performs a clear channel assessment (CCA) to gain a transmitting opportunity (TXOP). The initiating device detects Channel (CCA) busy due to other interfering radio signals in a wireless network. The wireless device obtains a spatially orthogonal (SO) condition with the other interfering radio signals via spatially reciprocal (SR) beamforming. The wireless device then initializes a spatial reuse frame exchange (gains a spatial reuse TXOP) by transmitting an RTS (Request-to-Send) frame to a target device using a beamformed antenna pattern upon satisfying the SO condition. Finally, the wireless device continues the beamformed frame exchange with the target device during the TXOP upon receiving a CTS (Clear-to-send) frame from the target device.

In another embodiment, an access point (AP) first initializes a TXOP-based beamformed exchange with a non-AP station (STA). The AP then transmits an omni-beam frame to all stations associated with the AP to setup a protection duration (NAV) at the beginning of the TXOP. Finally, the AP switches to beamformed transmission and reception with the STA for the remainder of the TXOP duration. The beamformed transmission and reception is for both preamble and payload of each frame.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
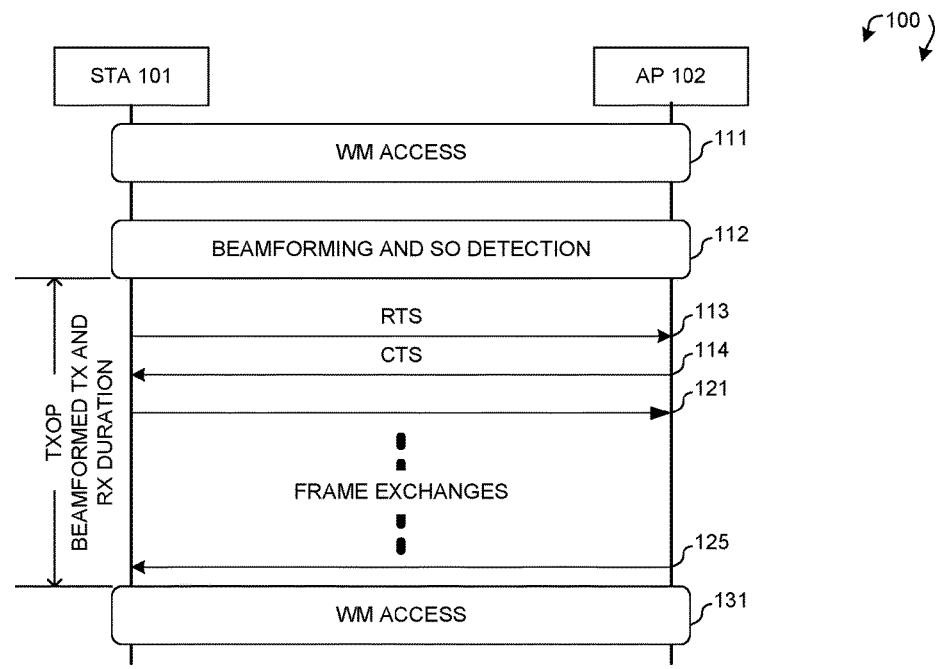
FIG. 1 illustrates a wireless network with beamforming enhancements for spatial reuse in accordance with one novel aspect.

FIG. 1 illustrates a wireless network 100 with beamforming enhancements for spatial reuse in accordance with one novel aspect. Wireless network 100 comprises a station STA 101 and an access point AP 102. In step 111, STA 101 initiates wireless medium access (WM access) via an enhanced distributed channel access (EDCA) contention procedure. EDCA is used for wireless devices to gain access to the shared wireless medium, e.g., to obtain a transmitting opportunity (TXOP) for transmitting radio signals onto the shared wireless medium. The basic assumption of EDCA is that a packet collision can occur if a device transmits signal under channel busy condition when the received signal level is higher than a clear channel access (CCA) level. When one device detects channel idle condition and wins the medium contention (i.e., gains the TXOP), all other devices back off from using the medium to allow frame exchange between a pair of devices during the TXOP. Typically, spatial reuse is not allowed in WiFi, which results in low area throughput.

If STA 101 is located at cell edge of a basic service set (BSS), then it typically suffers from difficulty with channel access (e.g., detects Channel (CCA) busy) due to overlapping BSS (OBSS) interference and higher packet collision rate from OBSS hidden nodes. Furthermore, STA 101 becomes interference to OBSS devices. In the example of FIG. 1, STA 101 is a cell edge device and detects Channel (CCA) busy during the WM access. In one novel aspect, STA 101 may apply beamforming to improve its situation while reducing interference to OBSS. More specifically, beamforming is used to explore spatial reuse and thereby improving network capacity.

In step 112, STA 101 applies spatially reciprocal (SR) beamforming and detects spatially orthogonal (SO) condition. Under SO condition, STA 101 does not receive other interfering signals using beamformed antenna pattern during an observation duration. In addition, STA 101 does not interfere other OBSS devices under spatially reciprocal beamforming, which means that the same beamformed antenna pattern is used for reception and transmission. Note that beamforming described in the present invention includes tone-by-tone beamforming, i.e., the beamformer employs different sets of antenna weight for different sub-carriers in a multi-tone signal such as OFDM. Consequently, STA 101 detects channel idle under spatially reciprocal beamforming and gains a TXOP and is allowed to transmit during the TXOP. In step 113, STA 101 starts with a request to send (RTS) frame to an intended recipient AP 102. In step 114, AP 102 transmits a clear to send (CTS) frame back to STA 101 if its NAV indicates the medium is idle (e.g., NAV=0). Upon receiving the CTS frame, STA 101 continues the beamformed frame exchange with AP 102 during the TXOP (step 121-125). Later on, STA 101 may initiates another WM access procedure whenever desired (step 131). The roles of AP and STA in the described procedure can be reversed in which AP 102 initiates (i.e., gaining the TXOP) a spatially orthogonal frame exchange under SO and SR conditions with a non-AP STA 101. In addition, STA 101 can transmit other control frame (instead of RTS frame) to start the spatially orthogonal frame exchange.

Figure 2:
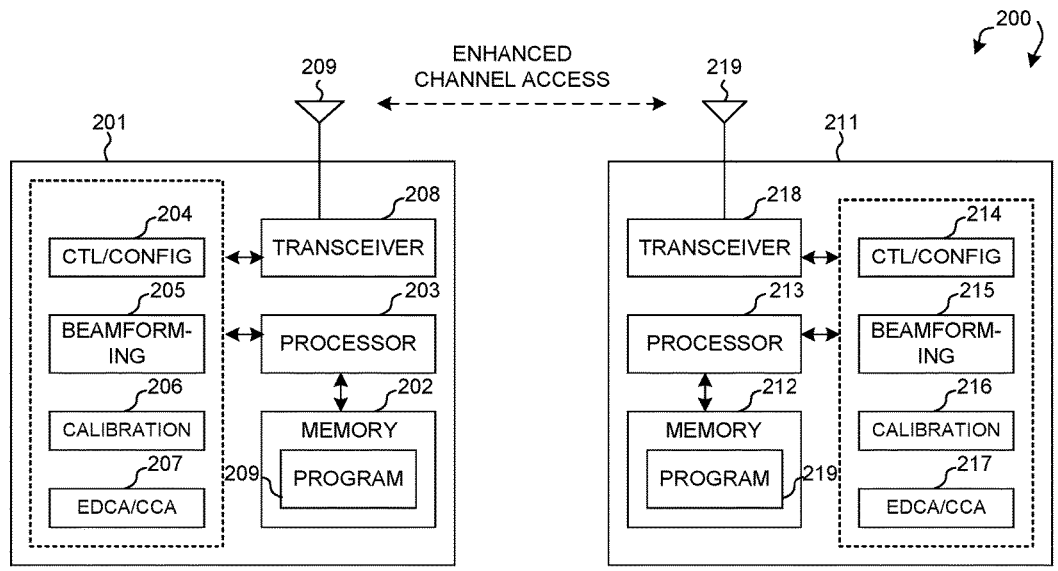
FIG. 2 is a simplified block diagram of a transmitting device and a receiving device in accordance with one novel aspect.

FIG. 2 is a simplified block diagram of a transmitting device 201 and a receiving device 211 in accordance with one novel aspect. Transmitting device 201 comprises memory 202, a processor 203, a control and configuration module 204, a beamforming module 205, a calibration module 206, an EDCA/CCA module 207, and a transceiver 208 coupled to antenna 209. Similarly, receiving device 211 comprises memory 212, a processor 213, a control and configuration module 214, a beamforming module 215, a calibration module 216, an EDCA/CCA module 217, and a transceiver 218 coupled to antenna 219. In the transmitting direction, the transceiver converts received baseband radio signals from the processor to RF signals and sends out to the antenna. In the receiving direction, the processor processes the received baseband radio signals from the transceiver and invoke different functional modules to perform various features supported by the wireless devices.

The different modules are functional modules that can be implemented in software, firmware, hardware, or any combination thereof. The function modules, when executed by processors 203 and 213 (via program instructions 209 and 219 contained in memory 202 and 212), interwork with each other to allow the wireless devices to perform enhanced beamforming for spatial reuse. For example, the EDCA/CCA module initiates a channel sensing, channel contention with random backoff procedure based on CSMA/CA, the calibration module calibrates the device to become spatially reciprocal either in the manufacturing process or via over the air calibration procedure, the beamforming module performs beamforming to achieve spatially orthogonal condition, and the control and configuration module performs various control and configuration functionalities associated with beamformed frame exchange.

Figure 3:
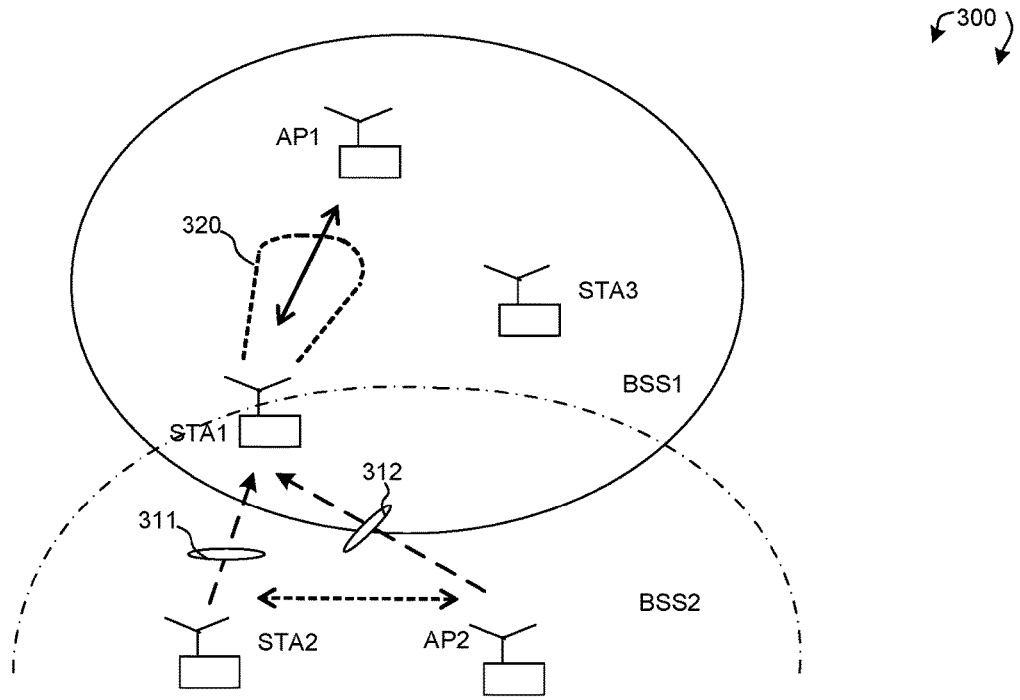
FIG. 3 illustrates spatially reciprocal (SR) transmission in a wireless network with OBSS.

FIG. 3 illustrates spatially reciprocal (SR) transmission in a wireless medium 300 with OBSS. Wireless medium 300 includes a first BSS1 comprising AP1, STA1 and STA3, and a second BSS2 comprising AP2 and STA2. BSS1 and BSS2 having overlapping coverage with each other and STA1 is located at the cell edge of BSS1. For cell edge device, STA1 suffers from difficulty with channel access (e.g., detects Channel busy) due to OBSS (e.g., STA2 and/or AP2) interference and higher packet collision rate from OBSS hidden nodes. Furthermore, STA1 becomes interference to OBSS devices STA2 and/or AP2.

Beamforming is an effective way to enhance cell edge performance. In general, beamforming can achieve higher physical rate, reduced interference to OBSS via beamformed transmission, reduced interference from OBSS via beamformed reception, and reduced delay spread. When more energy is delivered to the targeted receiver through TX beamforming, the less interference toward others. RX beamforming also mitigates the interference level. Results shown improved cell edge performance with TX or RX beamforming and less degradation in dense deployment.

In one novel aspect, STA1 may apply beamforming to improve its situation while reducing interference to OBSS. More specifically, beamforming is used to explore spatial reuse and thereby improving network capacity. In order to use beamforming to achieve spatial reuse, a wireless device should have the capability to perform spatially reciprocal transmission. Spatial reciprocity is a device capability of transmitting and receiving with the same antenna pattern that could be synthesized with multiple antennas. Spatial reciprocity can be obtained via implicit or via explicit calibration or other means. A spatially reciprocal device provides the following benefits. First, a spatially reciprocal device can use its channel knowledge derived from the received signal in its transmission. Second, a spatially reciprocal device reduces the overhead of over-the-air calibration if the device has already been calibrated before usage.

In the example of FIG. 3, suppose STA1 is a spatially reciprocal device. Without beamforming, STA1 can hear radio signal 311 transmitted from STA2, and/or radio signal 312 transmitted from AP2. Those radio signals are interfering radio signals from STA1's perspective. With beamforming, STA1 can no longer hear radio signal 311 transmitted from STA2, nor radio signal 312 transmitted from AP2, if STA1 uses a beamformed antenna pattern 320 with certain weights. Furthermore, because STA1 is a spatially reciprocal device, the radio signals transmitted from STA1 do not interfere STA2 nor AP2 if STA1 applies with the same beamformed antenna pattern 320. Because of beamformed SR transmission, OBSS devices STA1 and STA2/AP2 no longer interfere with each other, which makes spatial reuse possible.

Figure 4:
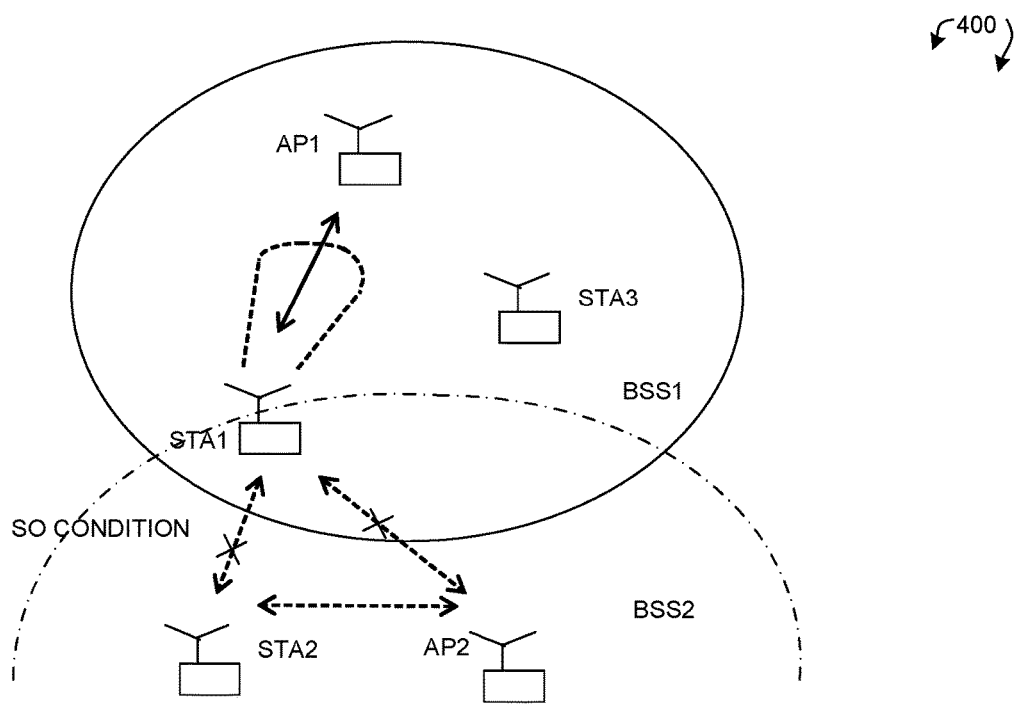
FIG. 4 illustrates spatially orthogonal (SO) condition to achieve spatial reuse in a wireless network with OBSS.

FIG. 4 illustrates a spatially orthogonal (SO) condition to achieve spatial reuse in a wireless network 400 with OBSS. Similar to wireless medium 300, wireless medium 400 includes a first BSS1 comprising AP1, STA1 and STA3, and a second BSS2 comprising AP2 and STA2. BSS1 and BSS2 having overlapping coverage with each other and STA1 is located at the cell edge of BSS1. Suppose that OBSS STA2 and AP2 are communicating with each other and STA1 wishes to transmit to AP1 at the same time under spatial reuse. To avoid STA1 interfering with OBSS STAs (e.g., STA2 and AP2), STA1 should satisfy spatially orthogonal (SO) condition before it transmits radio signals. The SO condition is defined as follows: STA1 does not receive AP2 and STA2 signals under beamformed condition during an observation duration (although STA1 did receive either STA2 or AP2 signal under unbeamformed condition). Under SO condition, once STA1 detects channel is idle, STA1 is allowed to transmit radio signals. Since STA1 does not receive AP2 and STA2 signals under SR beamforming and SO condition, the signals transmitted from STA1 do not interfere AP2 and STA2 with the same beamformed antenna pattern because STA1 is a spatially reciprocal device.

SO condition can be established in different ways. In a first embodiment, SO condition can be established via beamforming toward the intended receiver to suppress interference. In the example of FIG. 4, STA1 is only interested in communicating to AP1. STA1 thus decides the beamforming weight for SO condition based on its knowledge of channel to AP1 and/or other OBSS interference (STA2 and AP2) situations. In a second embodiment, SO condition can be established via active antenna nulling toward OBSS interference. In the example of FIG. 4, two antennas are needed if STA1 nulls from either STA2 or AP2, and three antennas are needed if STA1 nulls from both STA2 and AP2. Upon establishing SO condition, STA1 can start SO frame exchange with AP1.

Figure 5:
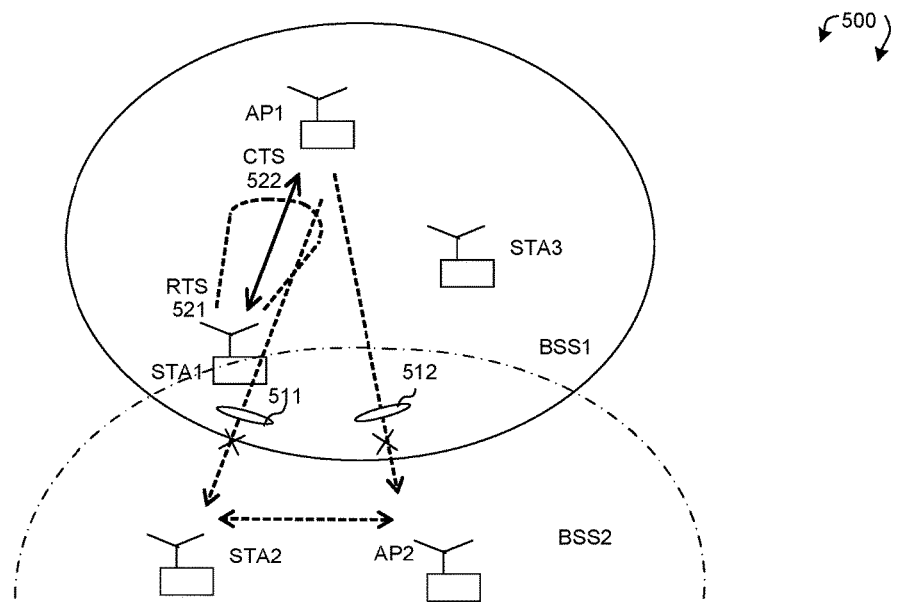
FIG. 5 illustrates a method of using RTS/CTS to start a spatially orthogonal frame exchange in a wireless network with OBSS.

FIG. 5 illustrates using RTS/CTS to start a spatially orthogonal frame exchange in a wireless medium 500. Similar to wireless medium 300 and 400, wireless medium 500 includes a first BSS1 comprising AP1, STA1 and STA3, and a second BSS2 comprising AP2 and STA2. BSS1 and BSS2 having overlapping coverage with each other and STA1 is located at the cell edge of BSS1. Suppose that OBSS STA2 and AP2 are communicating with each other and STA1 wishes to transmit to AP1 at the same time under spatial reuse. In addition, suppose that STA1 has already satisfied SO condition under beamforming and is now ready to start SO frame exchange with AP1. However, STA1 still needs to make sure that AP1 does not interfere with AP2 or STA2, i.e., radio signals 511 and 512 from AP1 should not interfere with both STA2 and AP2.

In accordance with one novel aspect, STA1 should start the SO frame exchange with RTS/CTS with AP1 to avoid AP1 from interfering with AP2 or STA2. For example, STA1 transmits an RTS frame 521 to AP1, using the beamformed antenna pattern established under SO condition. Upon receiving the RTS frame, as the intended receiver, AP1 checks NAV, a numerical setting indicate the duration that the medium is reserved or the length of TXOP. If NAV≠0, it means the medium is not idle and AP1 shall not respond to the RTS frame. On the other hand, if NAV=0, then it means that the medium is idle and AP1 may respond to the RTS frame by sending a CTS frame 522 back to the initiating device STA1. After STA1 receives the CTS frame from AP1, STA1 may continue the beamformed SO frame exchange with AP1 for the duration of the TXOP. Note that if AP1 is anticipating the STA1 transmission and AP1 establishes a spatially orthogonal condition with AP2 and STA2 and it detects channel idle under spatially reciprocal beamforming, it can transmit a CTS back to the initiating device STA1.

Figure 6:
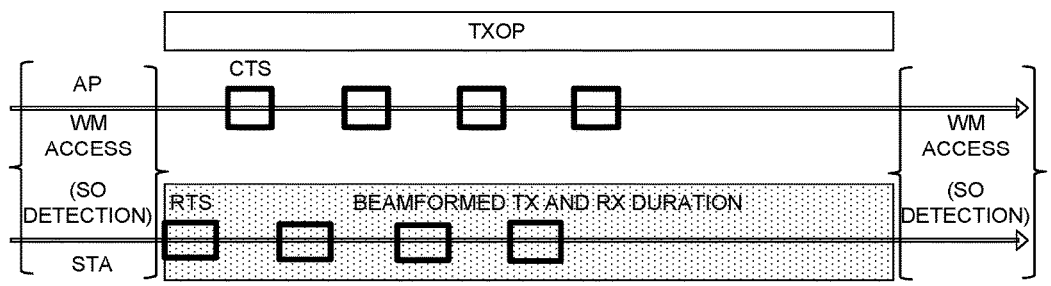
FIG. 6 illustrates spatial reuse of the wireless medium using beamforming and SO frame exchange.
Figure 6:
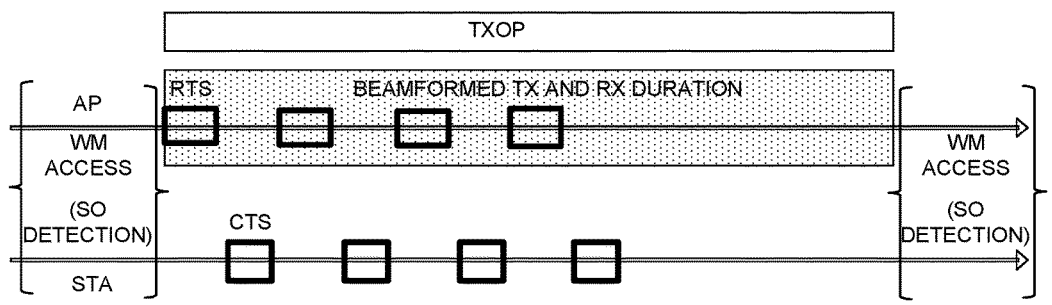

FIG. 6 illustrates spatial reuse of the wireless medium using beamforming and SO frame exchange. In general, a spatially reciprocal (SR) wireless device should be allowed to gain access to the channel when SO condition is satisfied, with beamforming weights determined by the wireless device based on its channel knowledge. Under SO condition, the wireless device can start an SO frame exchange by employing the beamformed (both preamble and payload) transmission and reception for the TXOP starting with an RTS/CTS. As a result, spatial reuse can be achieved in SO condition using beamformed frame exchange.

As depicted in the top half of FIG. 6, a non-AP STA is the initiator while an AP is the intended receiver. The STA first initiates WM access and detects SO condition by applying beamforming. Upon satisfying SO condition, the STA sends an RTS frame to the AP. Upon NAV indicates the medium is idle, the AP responds to the RTS frame by sending a CTS frame back to the STA. Note that the RTS frame is sent with the same beamformed antenna pattern under SO condition, while the CTS frame may be an unbeamformed frame. After RTS/CTS frame exchange, the STA continues beamformed SO frame exchange with the AP for the TXOP duration until the next WM access.

Similarly, as depicted in the bottom half of FIG. 6, the AP is the initiator while the non-AP STA is the intended receiver. The AP first initiates WM access and detects SO condition by applying beamforming. Upon satisfying SO condition, the AP sends an RTS frame to the STA. Upon NAV indicates the medium is idle, the STA responds to the RTS frame by sending a CTS frame back to the AP. Note that the RTS frame is sent with the same beamformed antenna pattern under SO condition, while the CTS frame may be an unbeamformed frame. After RTS/CTS frame exchange, the AP continues beamformed SO frame exchange with the STA for the TXOP duration until the next WM access.

When an AP is engaged in a frame exchange with a selected number of STAs, it should inform all STAs within the BSS to defer properly. This requires some omni-directional transmission. Furthermore, for PPDU-based beamforming, the AP needs to send omni-preamble and then switching to beamformed payload. However, switching between an omni-preamble to a beamformed transmission after omni-preamble is hard for OBSS receiver to predict the channel conditions. In accordance with one novel aspect, TXOP-based beamformed frame exchange can be used by the AP to communicate with certain STAs.

Figure 7:
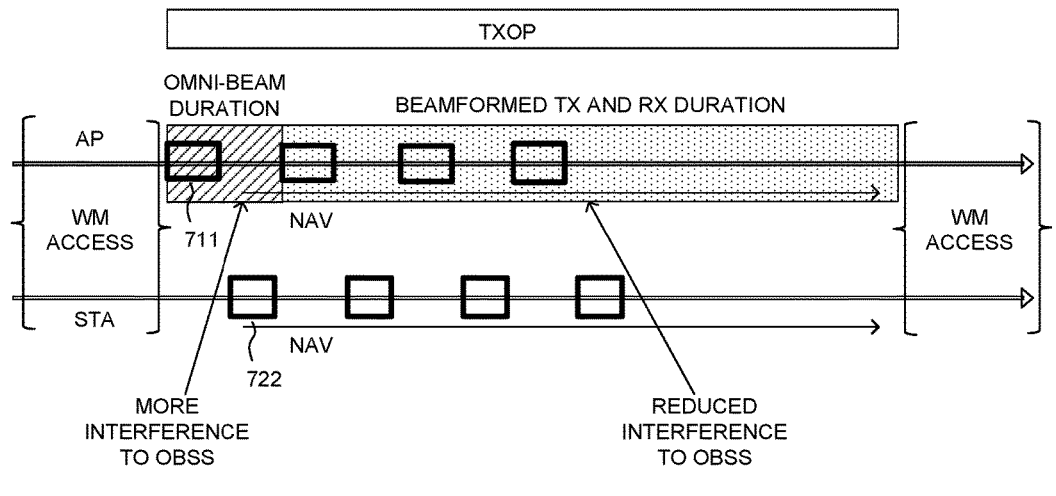
FIG. 7 illustrates TXOP-based beamformed frame exchange between an AP and a non-AP STA.

FIG. 7 illustrates TXOP-based beamformed frame exchange between an AP and a non-AP STA. The AP initiates WM access and decides to engage in a frame exchange with the STA. The AP first employs an omni-beam transaction at the beginning of a TXOP to setup protection duration (NAV) by sending frame a frame 711 with omni-beam. The omni transmission 711 by AP reaches all STAs associated with the AP in the BSS that set up the NAV accordingly. At the receiver side, the STA responds with a frame 712 to setup protection duration (NAV). Next, the AP switches to the beamformed (both preamble and payload) transmission and reception for the remainder of the TXOP duration. This way, minimum omni-beam duration is achieved, and beamformed transmission thru the remainder of the TXOP introduces minimum interference to OBSS.

Figure 8:
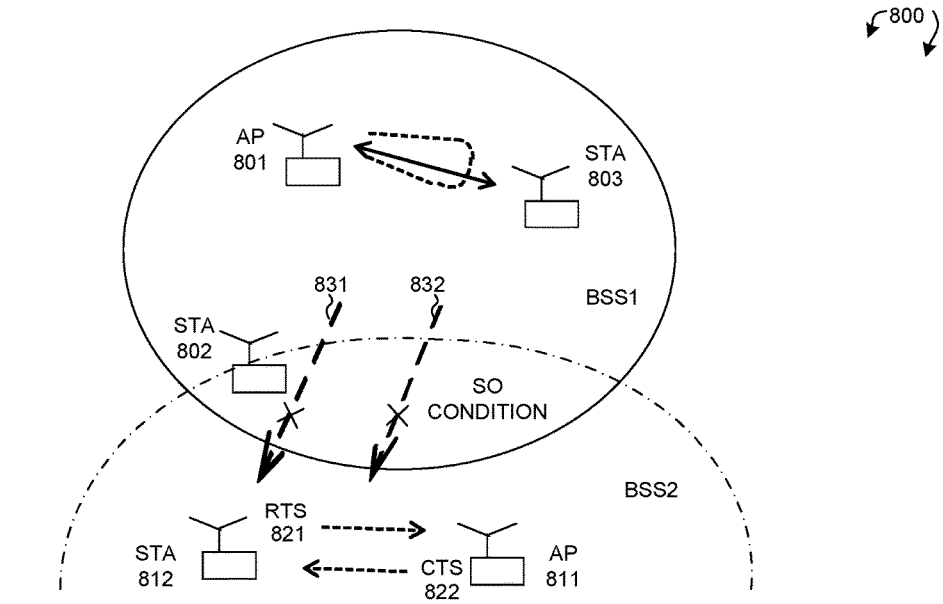
FIG. 8 illustrates TXOP-based beamformed and SO frame exchange in a wireless network.

FIG. 8 illustrates TXOP-based beamformed and SO frame exchange in a wireless medium 800. Wireless medium 800 includes a first BSS1 comprising AP 801, STA 8021 and STA 803, and a second BSS2 comprising AP 811 and STA 812. BSS1 and BSS2 having overlapping coverage with each other. In the example of FIG. 8, AP 801 establishes a TXOP-based beamformed frame exchange with STA 803. The TXOP-based beamformed frame exchange between an AP and a non-AP STA facilitates the spatial re-use by OBSS STAs. During such frame exchange, other OBSS devices (e.g., AP 811 or STA 812) should be allowed to start a frame exchange starting with RTS/CTS if the SO condition is satisfied. For example, if STA 812 does not receive radio signals 831 and 832 from AP 801 and STA 803, then it satisfies the SO condition. As a result, STA 812 can initiates SO frame exchange by sending an RTS 821 to AP 811. Upon receiving a CTS 822 from AP 811, STA 812 and AP 811 can continue the SO frame exchange (with or without beamforming). Furthermore, AP 801 can have more antennas for beamforming resulting in less interference. The TXOP-based beamformed frame exchange enables simple STAs to spatially reuse the medium as long as SO condition is satisfied.

Figure 9:
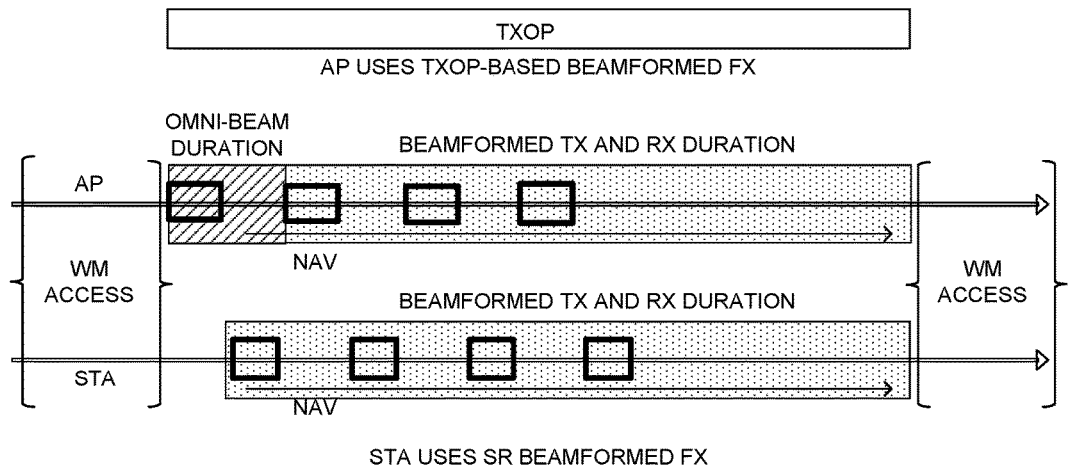
FIG. 9 illustrates TXOP-based beamformed frame exchange initiated by AP combined with SR beamformed frame exchange.

FIG. 9 illustrates TXOP-based beamformed frame exchange initiated by an AP combined with spatially reciprocal beamformed frame exchange. In the example of FIG. 9, the AP initiates the TXOP-based beamformed exchange with an STA. The AP first send an omni-beam PPDU at the beginning of the TXOP to inform all STAs associated with the AP the protection duration (NAV) for the beamformed frame exchange. The AP then switches to beamformed transmission for the remainder of the TXOP duration. At the receiver side, the STA also applies beamforming for SO frame exchange to increase spatial reuse and to reduce interference to OBSS.

Figure 10:
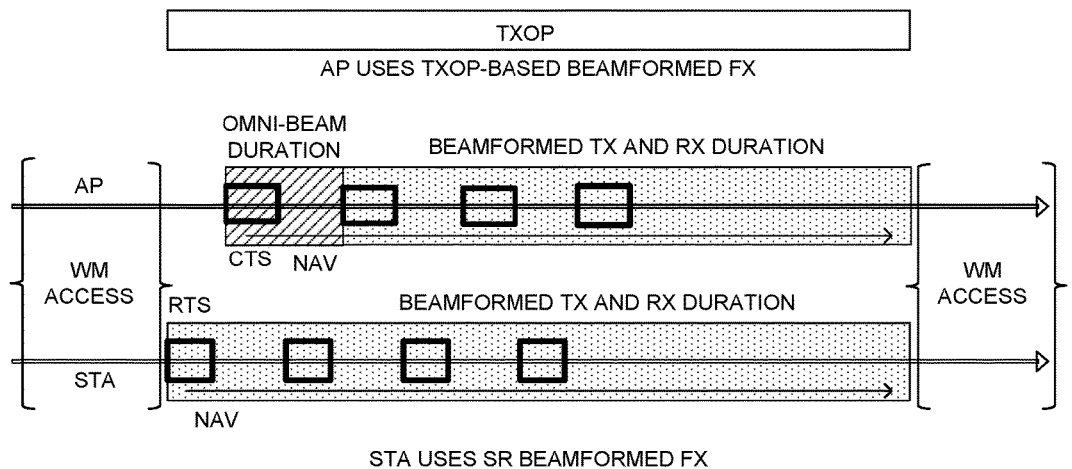
FIG. 10 illustrates SR beamformed frame exchange initiated by STA combined with TXOP-based beamformed frame exchange.

FIG. 10 illustrates spatially reciprocal beamformed frame exchange initiated by an STA combined with TXOP-based beamformed frame exchange. In the example of FIG. 10, the STA initiates beamformed SO frame exchange with an AP. Upon detecting SO condition, the STA first sends an RTS frame to the AP using the beamformed antenna pattern to setup protection duration (NAV). The AP responds with an omni-beam CTS frame to all STAs associated with the AP the protection duration (NAV) for the beamformed frame exchange. After receiving the CTS frame, the STA continues the SO beamformed frame exchange for the remainder of the TXOP duration. The AP also switches to the TXOP-based beamformed frame exchange for the remainder of the TXOP duration.

Figure 11:
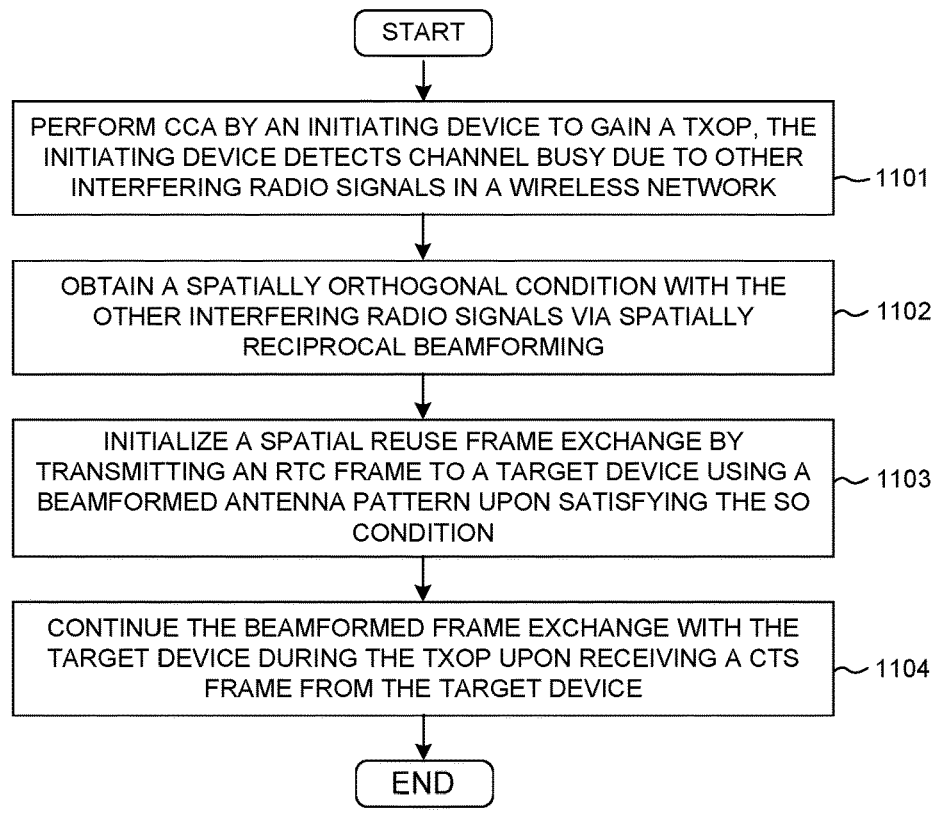
FIG. 11 is a flow chart of a method of performing beamforming enhancement to achieve spatial reuse in a wireless network.

FIG. 11 is a flow chart of a method of performing beamforming enhancement to achieve spatial reuse in a wireless network. In step 1101, an initiating wireless device performs a clear channel assessment (CCA) to gain a transmitting opportunity (TXOP). The initiating device detects Channel busy due to other interfering radio signals in a wireless network. In step 1102, the wireless device obtains a spatially orthogonal (SO) condition with the other interfering radio signals via spatially reciprocal (SR) beamforming. In step 1103, the wireless device initializes a spatial reuse frame exchange by transmitting an RTS frame to a target device using a beamformed antenna pattern upon satisfying the SO condition. In step 1104, the wireless device continues the beamformed frame exchange with the target device during the TXOP upon receiving a CTS frame from the target device.

Figure 12:
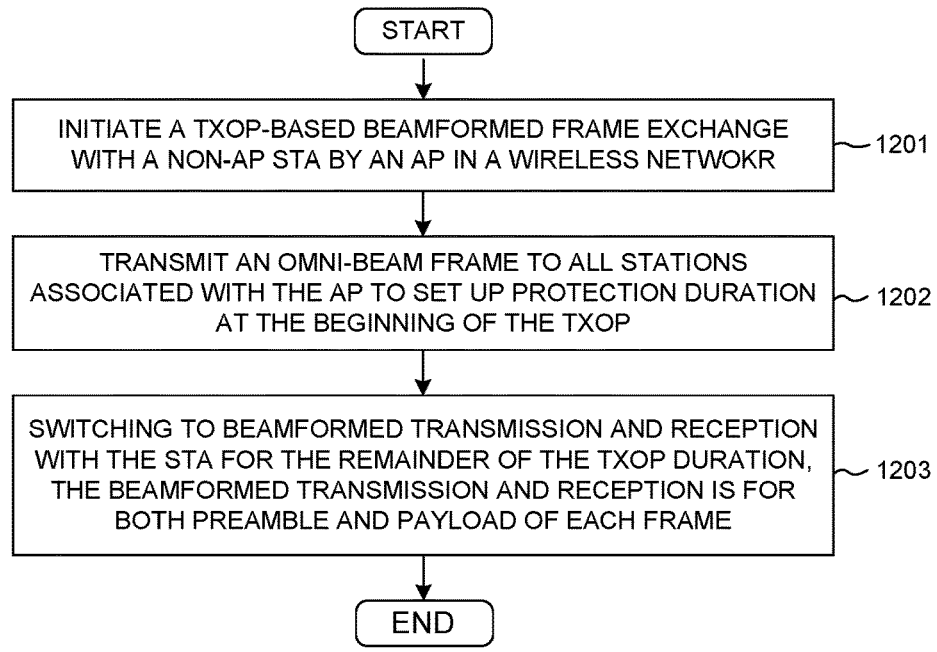
FIG. 12 is a flow chart of a method for establishing TXOP-based beamformed frame exchange in a wireless network.

FIG. 12 is a flow chart of a method of TXOP-based beamformed exchange in a wireless network in accordance with one novel aspect. In step 1201, an access point (AP) initializes a TXOP-based beamformed exchange with a non-AP station (STA). In step 1202, the AP transmits an omni-beam frame to all stations associated with the AP to setup a protection duration (NAV) at the beginning of the TXOP. In step 1203, the AP switches to beamformed transmission and reception with the STA for the remainder of the TXOP duration. The beamformed transmission and reception is for both preamble and payload of each frame.

Under the enhanced beamforming method, it increases the likelihood of channel access under dense deployment condition, it reduces interference to OBSS, it reduces collision during reception, and it increases the likelihood of spatial reuse in dense deployment scenario thus leading to higher network throughput. The proposed beamforming enhancement is suitable for HEW or TGax because there is no control of the WLAN deployment scenario due to unlicensed spectrum, no BSS-BSS coordination is required, and distributed algorithm accommodates mobile APs/devices and change channel conditions.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   performing a clear channel assessment (CCA) by an initiating wireless device to gain a transmitting opportunity (TXOP), wherein the initiating device belongs to a basic service set (BSS) and detects channel busy due to other interfering radio signals from an overlapping BSS (OBSS) in a wireless network;

obtaining a spatially orthogonal (SO) condition between radio signals in the BSS with the other interfering radio signals from the OBSS using a reciprocal beamformed antenna pattern; and transmitting radio signals to a target device of the BSS using the reciprocal beamformed antenna pattern upon satisfying the SO condition to achieve spatial reuse between the BSS and the OBSS, wherein the initiating device achieves the spatial reuse by first obtaining the SO condition and then transmitting a request to send (RTS) frame to the target device and receive a clear to send frame (CTS) from the target device.

2. The method of claim 1, wherein the transmitting radio signals further involves:

initializing a spatial reuse beamformed frame exchange by transmitting the request to send (RTS) frame to the target device using the spatially reciprocal beamformed antenna pattern; and continuing the beamformed frame exchange with the target device during the TXOP upon receiving the clear to send (CTS) frame from the target device.

3. The method of claim 1, wherein the SO condition is obtained via beamforming toward the target device and thereby determining the beamformed antenna pattern.

4. The method of claim 1, wherein the SO condition is obtained via antenna nulling toward the other interfering radio signals.

5. The method of claim 1, wherein the SO condition is obtained via the beamformed antenna pattern that is derived from channel knowledge of the other interfering radio signals.

6. The method of claim 1, wherein the initiating device has a spatial reciprocity capability of transmitting and receiving with the same antenna pattern.

7. The method of claim 6, wherein the spatial reciprocity capability is obtained via calibration.

8. The method of claim 1, wherein the target device is an access point (AP), and wherein the AP employs omni-beam transmission at the beginning of the TXOP to set up protection duration and then switches to beamformed transmission and reception for the remaining of the TXOP.

9. The method of claim 1, wherein the target device obtains channel idle via beamforming and is clear of medium reservation prior to receiving the RTS frame from the initiating device, and wherein the target device responds with the CTS frame to the initiating device using its own spatially reciprocal beamformed antenna pattern and continuing the beamformed frame exchange with the initiating device during the TXOP.

10. The method of claim 1, wherein the initiating wireless device under SO condition and SR beamforming initiates a SO frame exchange via transmitting a control frame to gain access to medium.

11. A wireless device, comprising:

a clear channel assessment (CCA) module that performs a channel sensing to gain a transmitting opportunity (TXOP), wherein the wireless device belongs to a basic service set (BSS) and detects channel busy due to other interfering radio signals from an overlapping BSS (OBSS) in a wireless network;

a beamforming module that obtains a spatially orthogonal (SO) condition between radio signals in the BSS with the other interfering radio signals from the OBSS using a reciprocal beamformed antenna pattern; and a transmitter that transmits radio signals to a target device of the BSS using the reciprocal beamformed antenna pattern upon satisfying the SO condition to achieve spatial reuse between the BSS and the OBSS, wherein the wireless device achieves the spatial reuse by first obtaining the SO condition and then transmitting a request to send (RTS) frame to the target device and receive a clear to send frame (CTS) from the target device.

12. The device of claim 11, wherein the device initializes a spatial reuse beamformed frame exchange by transmitting the request to send (RTS) frame to the target device using the spatially reciprocal beamformed antenna pattern, and wherein the device continues the beamformed formed frame exchange during the TXOP upon receiving the clear to send (CTS) frame from the target device.

13. The device of claim 11, wherein the SO condition is obtained via beamforming toward the target device and thereby determining the beamformed antenna pattern.

14. The device of claim 11, wherein the SO condition is obtained via antenna nulling toward the other interfering radio signals.

15. The device of claim 11, wherein the SO condition is obtained via the beamformed antenna pattern that is derived from channel knowledge of the other interfering radio signals.

16. The device of claim 11, wherein the initiating device has a spatial reciprocity capability of transmitting and receiving with the same antenna pattern.

17. The device of claim 16, wherein the spatial reciprocity capability is obtained via calibration.

18. The device of claim 11, wherein the target device is an access point (AP), and wherein the AP employs omni-beam transmission at the beginning of the TXOP to set up protection duration and then switches to beamformed transmission and reception for the remaining of the TXOP.

19. The device of claim 11, wherein the target device obtains channel idle via beamforming and is clear of medium reservation prior to receiving the RTS frame from the initiating device, and wherein the target device responds with the CTS frame to the initiating device using its own spatially reciprocal beamformed antenna pattern and continuing the beamformed frame exchange with the initiating device during the TXOP.

20. The device of claim 11, wherein the initiating wireless device under SO condition and SR beamforming initiates a SO frame exchange via transmitting a control frame to gain access to medium.

21. A method comprising:

initiating a transmitting opportunity (TXOP) based beamformed frame exchange with a non-access point station (non-AP STA) by an AP belonging to a basic service set (BSS) in a wireless network;

transmitting an omni-beam frame to all stations associated with the AP to setup protection duration at the beginning of the TXOP; and switching to beamformed transmission and reception with the STA for the remainder of the TXOP duration, wherein the beamformed transmission and reception is for both preamble and payload of each frame, and wherein the TXOP-based beamformed frame exchange enables spatial reuse for other devices under spatially orthogonal (SO) condition, wherein the SO condition is obtained between radio signals in the BSS with the other interfering radio signals from an overlapping BSS (OBSS) using a reciprocal beamformed antenna pattern.

22. The method of claim 21, wherein the AP has a spatial reciprocity capability of transmitting and receiving with the same antenna pattern.

23. The method of claim 21, wherein the spatially orthogonal condition may be obtained with or without beamforming.

* * * * *